United States Patent [19]

Snape

[11] 3,905,389

[45] Sept. 16, 1975

[54] SLIDE VALVE ASSEMBLIES
[75] Inventor: George William Snape, London, England
[73] Assignee: Bulk Unit Load Systems Limited, London, England
[22] Filed: Nov. 30, 1973
[21] Appl. No.: 420,546

[30] Foreign Application Priority Data
Nov. 30, 1972 United Kingdom............... 55431/72

[52] U.S. Cl................... 137/375; 251/62; 251/326; 251/335 A
[51] Int. Cl.².......................................... F16K 7/14
[58] Field of Search............ 251/335 A, 335 B, 326; 137/375

[56]  References Cited
UNITED STATES PATENTS
1,998,882   4/1935   Merrill................................. 137/375
2,631,613   3/1953   Bergstrom....................... 251/335 A
2,644,664   7/1953   Hansen........................... 251/335 A
3,258,244   6/1966   Hilton............................. 251/326 X FOREIGN PATENTS OR APPLICATIONS
137,351   12/1947   Australia............................ 137/375

Primary Examiner—Arnold Rosenthal
Attorney, Agent, or Firm—Bacon & Thomas

[57] ABSTRACT

A slide valve assembly comprises a closure member for an orifice, the closure member being reciprocable in guide means between open and closed positions. A flexible membrane prevents any material within the orifice from entering the guide means for the closure member, the membrane comprising a bag which loosely envelopes the closure member, the closed end of the bag being attached to the end of the closure member which leads during the closing movement and the open end of the bag being sealingly fixed at a point which remains stationary during both the opening and closing movements of the closure member.

6 Claims, 2 Drawing Figures

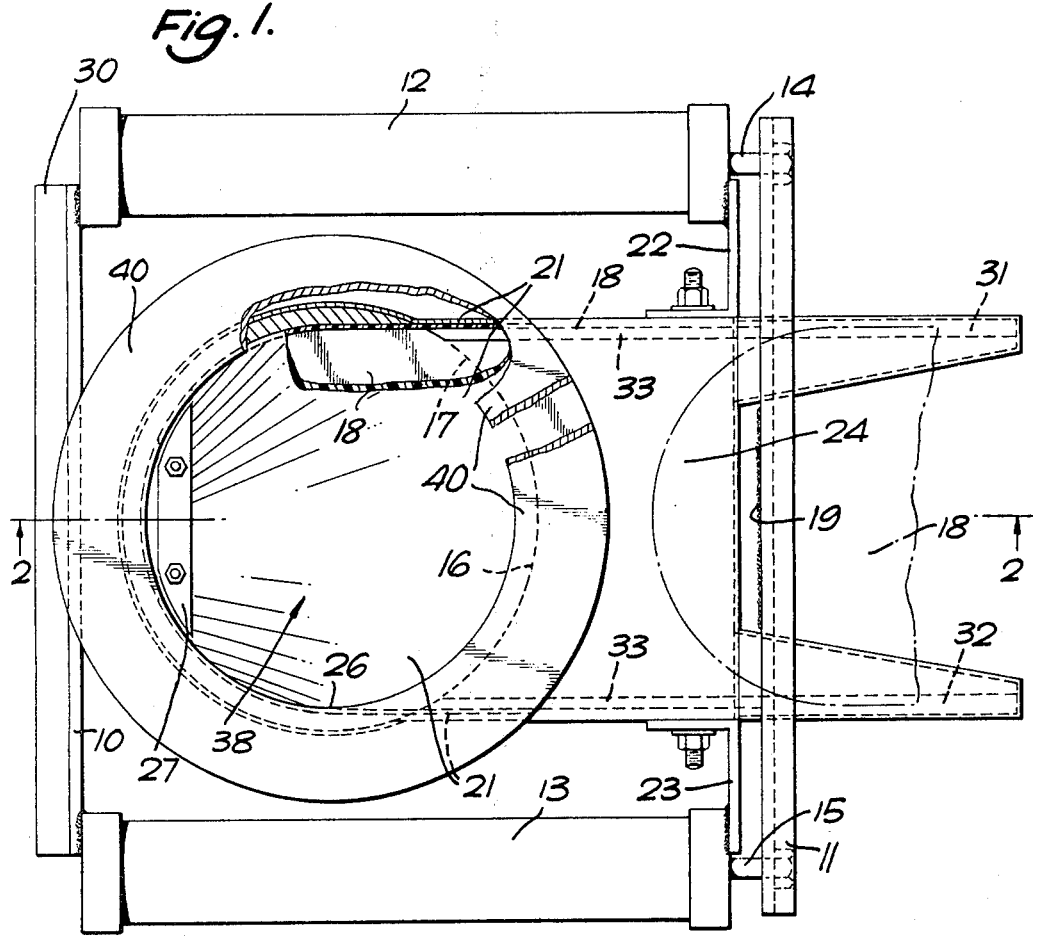
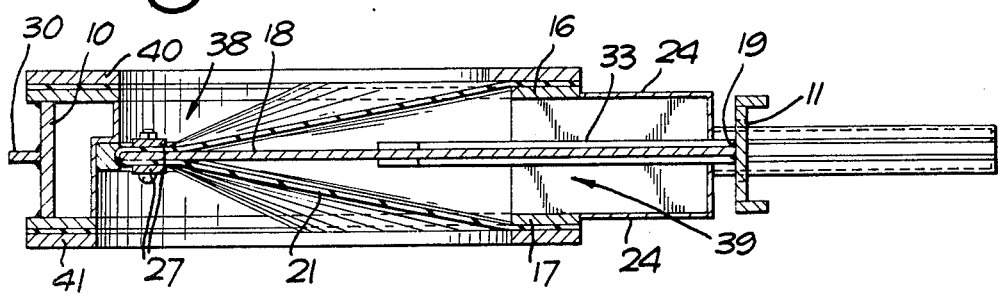

3,905,389

SLIDE VALVE ASSEMBLIES

BACKGROUND OF THE INVENTION

1. Field of the Invention

The invention relates to slide valve assemblies and particularly, but not exclusively, to slide valve assemblies for use in controlling the flow of powder materials. Valve assemblies in accordance with the invention may also be used for controlling the flow of pastes, slurries and liquids.

2. Prior Art

It is known to dispense powder material, e.g. from a container, through an orifice provided with a slide valve assembly acting transversely to the flow of powder. However, all such constructions hitherto have suffered from the problem of powder passing into the valve slides and causing a build-up which affects the efficient functioning of the valve.

Moreover, the transverse sliding action of the valve tends to withdraw powder through the wall of the orifice and thereby actively to assist leakage of powder. This effect is especially prevalent in the case of fine powders.

SUMMARY

According to the invention, a slide valve assembly comprises a closure member for an orifice, the closure member being reciprocable in guide means between open and closed positions, and a flexible membrane preventing any material within the orifice from entering the guide means for the closure member, the membrane comprising a bag which loosely envelopes the closure member, the closed end of the bag being attached to the end of the closure member which leads during the closing movement and the open end of the bag being sealingly fixed at a point which remains stationary during both the opening and closing movements of the closure member.

Preferably the peripheral wall of the orifice defines a slot through which the closure member passes, and the open end of the membrane bag is fixed to the walls of the slot. It is also preferred that a housing is provided externally of the orifice and open to said slot, into which housing the membrane is retracted when the closure member is moved into its open position.

The closed end of the membrane bag is preferably attached to the closure member by a removable clamp.

The valve may be manually operable. Alternatively, means may be provided for reciprocating the closure member between its open and closed positions. Said reciprocating means may be at least one hydraulic or pneumatic cylinder.

BRIEF DESCRIPTION OF THE DRAWINGS

FIG. 1 is a plan view, by way of example, of a slide valve assembly; and

FIG. 2 is a sectional view along the line 2—2 in FIG. 1, the closure member being shown in its closed position.

DESCRIPTION OF THE PREFERRED EMBODIMENT

A slide valve assembly has a frame formed of two webs 10 and 11 joined by two double-acting air cylinders 12 and 13 at right angles to the webs, which air cylinders are arranged with their piston rods 14 and 15 respectively connected to the web 11. At their other ends the cylinders are fixed to the web 10. There are upper and lower orifice annular plates 16 and 17 respectively, which are rigid with the web 10, and define an orifice 38 to be closed by the valve. The valve has a plate type closure member 18 reciprocable along guides 33 extending parallel to the air cylinders 12 and 13 and which is connected to the web 11 at a weld 19. The closure member during its opening and closing movements passes through a slot 39 in the peripheral wall of the orifice defined by the plates 16 and 17.

There is a flexible membrane bag 21 made of Linatex, (a proprietary material made by Wilkinson Rubber Linatex Ltd.) which at its open end is connected to the upper and lower orifice plates 16 and 17, and is sealingly fixed thereto by further annular plates 40 and 41 respectively between the points 25 and 26. The membrane bag 21 also loosely envelopes the closure member 18 and is attached to the leading edge of the closure member by bars 27 which are bolted together to form a removable clamp.

Two angle brackets 22 and 23 are connected to the ends of the air cylinders 12 and 13 respectively which are remote from the web 10 and remain stationary relative to the upper and lower orifice plates 16 and 17. The brackets 22 and 23 support a cover assembly 24 which both provides a peripheral wall for the orifice 38 and surrounds the closure member 18 when it is withdrawn from its closed position. The cover member 24 which carries the guides 33 thus forms a housing externally of the orifice 38 and open to the slot 39 into which the flexible membrane bag 21 is withdrawn when the closure member 18 is moved into its retracted or open position.

The valve assembly may be mounted to a structure by a flange 30 outstanding from the web 10, and/or by lateral extensions 31 and 32 of the cover 24. In either case, the web 10 constitutes a fixed web and the web 11 is moved towards or away from the web 10 by operation of the cylinders 12 and 13.

In use the membrane 21 provides a flexible wall which separates the guides 33 from the orifice 38 and prevents material passing through the orifice 38 from entering the guides 33 for the reciprocable closure member 18. The membrane 21 also prevents any leakage of material through the slot 39 provided in the peripheral wall of the orifice 38.

Another advantage of the embodiment described above is that the removable clamp constituted by the bars 27 allows the closure member to be withdrawn without disturbing the sealing of the membrane bag to the peripheral wall of the orifice.

A further advantage of this embodiment is that it avoids the use of narrow gaps between the peripheral wall of the orifice and the membrane by virtue of fixing the open end of the membrane bag within the peripheral wall; and yet still an opening of 95% of the area of the orifice may be obtained when the closure member is in its fully open position.

In an alternative embodiment in which it is desired to fix the open end of the bag at a point externally of the peripheral wall of the orifice, the problem of said narrow gaps is overcome by providing gaps having a clearance dimension substantially greater than those normally provided in valve assemblies designed particularly for use with liquids. Thereby any powder material which enters the gaps will not preclude the operation of the valve assembly.

Hydraulic cylinders may be provided instead of the air cylinders described above. Alternatively only one hydraulic or pneumatic cylinder may be provided, the cylinder being attached to the centre of the web 11 and operating in reverse sequence from cylinders 12 and 13 to open and close the orifice.

In a further embodiment of the invention means are provided for operating the closure member manually.

Whilst a construction of slide valve assembly in accordance with this invention is particularly advantageous for use in apparatus for dispensing powder material from a container, it may, of course, also be used with other materials such as slurries, pastes and liquids.

I claim:

1. A slide valve assembly, comprising: an orifice having a peripheral wall, said peripheral wall having a slot therein providing walls; a flexible, membrane type bag having an open end and a closed end and adapted to extend across said orifice; means securing the open end of said bag to the walls of said slot; a flat plate type closure member movable through the fixed open end of said bag and to the closed end of the bag for closing and opening said orifice; guide means disposed on each side of said closure member and extending from outside of the peripheral wall of said orifice and into the open end of the bag for guiding it between the closed and open positions; and means removably attaching the closed end of said bag to the end of the closure member which leads during the closing movement thereof, said bag providing a flexible wall separating said guide means from the interior of said orifice.

2. An assembly as claimed in claim 1, including a housing externally of the orifice and open to said slot, into which housing the membrane is retracted when the closure member is moved into its open position.

3. An assembly as claimed in claim 1, wherein the closed end of the membrane bag is attached to the closure member by a removable clamp.

4. An assembly as claimed in claim 1, including means for reciprocating the closure member between its open and closed positions.

5. An assembly as claimed in claim 4, wherein said reciprocating means is at least one hydraulic or pneumatic cylinder.

6. An assembly as claimed in claim 2 wherein said guide means is carried by said housing.

* * * * *